US009344640B2

(12) United States Patent
Tanaka et al.

(10) Patent No.: US 9,344,640 B2
(45) Date of Patent: May 17, 2016

(54) IMAGING DEVICE, INTEGRATED CIRCUIT, AND FLICKER REDUCTION METHOD

(71) Applicant: PANASONIC INTELLECTUAL PROPERTY CORPORATION OF AMERICA, Torrance, CA (US)

(72) Inventors: Yoshiteru Tanaka, Fukuoka (JP); Ikuo Fuchigami, Fukuoka (JP); Tsuyoshi Nakamura, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/422,280

(22) PCT Filed: Mar. 20, 2014

(86) PCT No.: PCT/JP2014/001602
§ 371 (c)(1),
(2) Date: Feb. 18, 2015

(87) PCT Pub. No.: WO2014/199542
PCT Pub. Date: Dec. 18, 2014

(65) Prior Publication Data
US 2015/0229824 A1  Aug. 13, 2015

(30) Foreign Application Priority Data
Jun. 14, 2013 (JP) .................................. 2013-125395

(51) Int. Cl.
*H04N 5/235* (2006.01)
*H04N 5/217* (2011.01)
(52) U.S. Cl.
CPC ............. *H04N 5/2357* (2013.01); *H04N 5/217* (2013.01)

(58) Field of Classification Search
CPC ..................................................... H04N 5/2357
USPC ........................................................ 348/226.1
See application file for complete search history.

(56) References Cited

U.S. PATENT DOCUMENTS

2005/0093996 A1*  5/2005  Kinoshita .................. 348/226.1
2006/0055823 A1*  3/2006  Kinoshita et al. ............. 348/511
(Continued)

FOREIGN PATENT DOCUMENTS

JP  2004-222228 A  8/2004
JP  2006-352242 A  12/2006
(Continued)

OTHER PUBLICATIONS

International Search Report for corresponding International Application No. PCT/JP2014/001602 mailed Apr. 28, 2014.

*Primary Examiner* — James Hannett
(74) *Attorney, Agent, or Firm* — Renner, Otto, Boisselle & Sklar, LLP

(57) ABSTRACT

This image capture device (100) includes: an image sensor (102); an integrated value calculating section (210) which calculates, on a frame-by-frame basis, a value of a line integral of luminance values with respect to each of a plurality of horizontal lines included in a frame; a memory (220); an average calculating section (230) which calculates a line average value by working out the average of the values of the line integral on the same horizontal line between the newest frame and a number of other frames gotten earlier than the newest one in the memory (220); a waveform data generating section (240) which generates waveform data by normalizing the value of the line integral in the memory (220) based on the value of the line integral and a line average value; and a flicker extracting section (250) which extracts information about the phase and frequency of the flicker based on the waveform data.

10 Claims, 6 Drawing Sheets

(56) References Cited

U.S. PATENT DOCUMENTS

| | | |
|---|---|---|
| 2006/0279641 A1 | 12/2006 | Takahashi et al. |
| 2007/0046789 A1* | 3/2007 | Kirisawa .................... 348/226.1 |
| 2007/0052816 A1* | 3/2007 | Nomura et al. ............ 348/226.1 |
| 2008/0018751 A1 | 1/2008 | Kushida |

FOREIGN PATENT DOCUMENTS

| | | |
|---|---|---|
| JP | 2007-180741 A | 7/2007 |
| JP | 2009-017363 A | 1/2009 |

* cited by examiner (a)

(b)

(c)

IMAGING DEVICE, INTEGRATED CIRCUIT, AND FLICKER REDUCTION METHOD

TECHNICAL FIELD

The present application relates to a technique for relieving an image signal representing an image shot of flicker which has been produced as bright and dark portions in the image shot due to illumination's flickering.

BACKGROUND ART

When video is shot under an environment illuminated with a (non-inverter) fluorescent lamp, the luminance signal varies due to the AC voltage frequency of the fluorescent lamp (at 50 Hz or 60 Hz), thus producing bright and dark portions in an image shot. Such a phenomenon is generally called "flicker". In the field of such a flicker reducing technique, the techniques disclosed in Patent Documents Nos. 1 and 2 are known, for example.

According to the technique disclosed in Patent Document No. 1, as many values of a line integral as the number of frames corresponding to the greatest common divisor of the flicker period and frame period are stored in a memory. In this case, each of the values of the line integral is obtained by calculating the integral of pixel values on a horizontal line basis within a frame. Among multiple frames, the values of the line integral are normalized based on the average of the values of the line integral of associated horizontal lines. And based on that normalized a value of a line integral, flicker is analyzed.

Patent Document No. 2 discloses a technique for extracting information about the phase and amplitude of flicker based on a waveform representing the difference between the respective integral values in the same region of two images that have a flicker phase difference of 180 degrees between them.

CITATION LIST

Patent Literature

Patent Document No. 1: Japanese Laid-Open Patent Publication No. 2004-222228
Patent Document No. 2: Japanese Laid-Open Patent Publication No. 2007-180741

SUMMARY OF INVENTION

Technical Problem

However, according to the conventional technique described above, the flicker detection accuracy achieved still needs to be improved and the memory space to use still needs to be reduced.

A non-limiting exemplary embodiment of the present application provides an image capture device which can improve the flicker detection accuracy and which can save the memory space to use.

Solution to Problem

To overcome the problems described above, an aspect of the present invention provides an image capture device which reduces flicker caused by illumination from an image signal which has the flicker. The device includes: an image sensor which captures a subject image and generates the image signal; an integrated value calculating section which calculates, on a frame-by-frame basis, a value of a line integral of luminance values with respect to each of a plurality of horizontal lines that are included in a frame based on an image signal associated with each of the plurality of horizontal lines; a memory which stores the values of the line integral of multiple images; an average calculating section which calculates a line average value by working out the average of the values of the line integral on the same horizontal line between the newest frame and a number of other frames gotten earlier than the newest one in the memory; a waveform data generating section which generates waveform data comprised of normalized values by performing normalization processing by dividing each of the values of the line integral stored in the memory by the line average value of the same horizontal line and subtracting one from the quotient; and a flicker extracting section which extracts information about the phase and frequency of the flicker by detecting, in the multiple frames, a horizontal line location where the waveform data gotten from the waveform data generating section has a value of substantially zero.

This general and particular aspect can be implemented as a system, a method and a computer program or a combination thereof.

Advantageous Effects of Invention

An image capture device according to an aspect of the present invention can detect flicker more accurately and can reduce the memory space to use.

DESCRIPTION OF EMBODIMENTS

Figure 1:
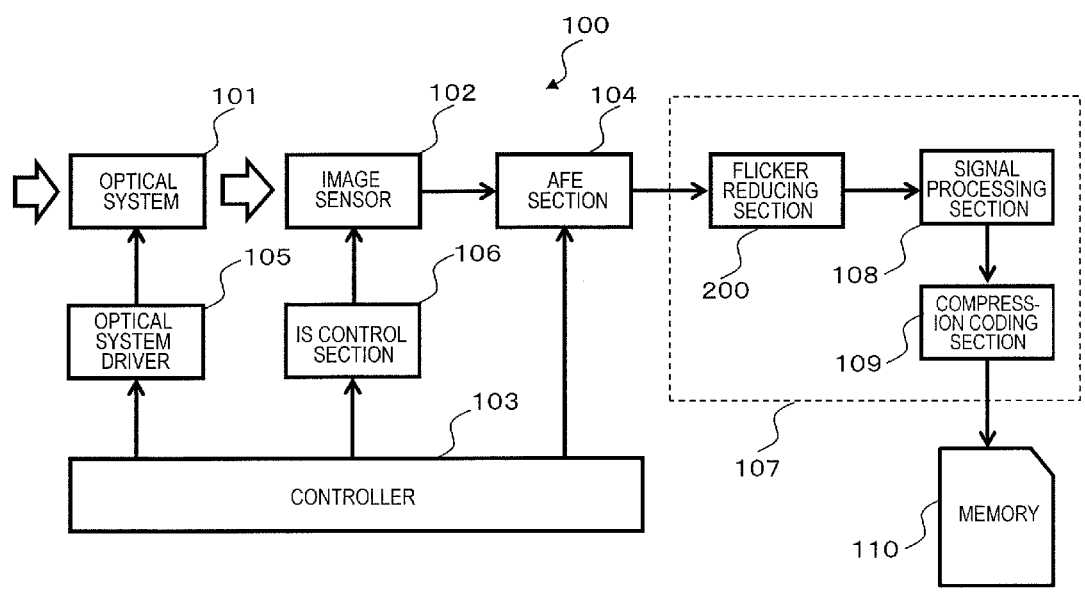
FIG. 1 is a block diagram illustrating a configuration for an image capture device 100 according to a first exemplary embodiment.

First of all, the problem the present inventors studied will be described. After that, an image capture device according to an exemplary embodiment of the present invention will be described with reference to the accompanying drawings.

The discovery that forms the basis of the present invention is as follows.

According to conventional technologies, when filter reduction processing is carried out, the number of frames needs to be set so that the phase of the flicker matches that of the frame rate. This number of frames is defined based on a frequency that is the greatest common divisor between the frequency of the flicker and the frame rate. For example, if the flicker frequency is 100 Hz and the frame rate is 60 fps, the frequency to be the greatest common divisor will be 20 Hz. Thus, the number of frames becomes three (=60/20).

However, supposing a shooting session is going to be carried out at a high frame rate, if the flicker frequency is 100 Hz and if the frame rate is 240 fps, for example, the frequency to be their greatest common divisor becomes 20 Hz. But the number of frames converted becomes as large as twelve (=240/20). Thus, if the frame rate is raised from 60 fps to 240 fps, the number of frames needed increases fourfold.

As can be seen, when a shooting session is going to be carried out at a high frame rate, information about a huge number of frames needs to be stored in a memory depending on the frame rate, and therefore, a lot more memory space needs to be used, which is a problem.

Also, according to conventional technologies, information about the phase and amplitude of flicker is extracted based on a waveform representing the difference between the respective integral values of two images at the same region where the flicker's phase difference becomes 180 degrees.

However, due to the movement of the subject of a movie being shot and/or the shake of the camera body (particularly when the subject is moving vertically on the image), a variation in the luminance of the image is superposed on the flicker component, thus making it difficult to detect the flicker component alone. Among other things, if a flicker component needs to be detected from only two image areas, the flicker component often tends to be detected erroneously.

The present inventors perfected our invention to overcome these problems.

An aspect of the present invention can be outlined as follows.

An image capture device according to an aspect of the present invention reduces flicker caused by illumination from an image signal which has the flicker. The device includes: an image sensor which captures a subject image and generates the image signal; an integrated value calculating section which calculates, on a frame-by-frame basis, a value of a line integral of luminance values with respect to each of a plurality of horizontal lines that are included in a frame based on an image signal associated with each of the plurality of horizontal lines; a memory which stores the values of the line integral of multiple images; an average calculating section which calculates a line average value by working out the average of the values of the line integral on the same horizontal line between the newest frame in the memory and a number of other frames gotten earlier than the newest one in the memory; a waveform data generating section which generates waveform data comprised of normalized values by performing normalization processing by dividing each of the values of the line integral stored in the memory by the line average value of the same horizontal line and subtracting one from the quotient; and a flicker extracting section which extracts information about the phase and frequency of the flicker by detecting, in the multiple frames, a horizontal line location where the waveform data gotten from the waveform data generating section has a value of substantially zero.

In one embodiment, the flicker extracting section includes a counter which increments its count every time the location is detected, and detects the location at least three times and extracts information about the phase and frequency of the flicker by linear regression by reference to the counter's value and information about the location.

In one embodiment, the frame includes an image in a valid pixel region and an image in an invalid pixel region in a vertical blanking interval with respect to the image sensor, and the counter increments its count every time the location is detected in the valid pixel region and in the invalid pixel region.

In one embodiment, at least one of the number of frames stored in the memory and the number of frames retrieved by the average calculating section from the memory is determined by the frame rate of the image sensor.

In one embodiment, the flicker extracting section calculates the amplitude of the flicker by multiplying the standard deviation of the normalized value by $\sqrt{2}$.

In one embodiment, the flicker extracting section performs low-pass filter processing on the waveform data.

In one embodiment, the flicker extracting section detects the location of a horizontal line, where the value of the waveform data becomes substantially equal to zero, in the multiple frames according to a change in the sign of the normalized value, based on respective normalized values before and after the sign changes.

An integrated circuit according to an aspect of the present invention reduces flicker caused by illumination from an image signal which is generated by an image sensor and which has the flicker. The circuit is configured to: calculate, on a frame-by-frame basis, a value of a line integral of luminance values with respect to each of a plurality of horizontal lines that are included in a frame based on an image signal associated with each of the plurality of horizontal lines; calculate a line average value by working out the average of the values of the line integral on the same horizontal line between the newest frame and a number of other frames gotten earlier than the newest one; generate waveform data comprised of normalized values by performing normalization processing by dividing each said value of the line integral by the line average value of the same horizontal line and subtracting one from the quotient; and extract information about the phase and frequency of the flicker by detecting, in the multiple frames, a horizontal line location where the waveform data gotten from the waveform data generating section has a value of substantially zero.

In one embodiment, the integrated circuit further includes a memory, which stores the values of the line integral of multiple frames.

A flicker reducing method according to an aspect of the present invention is designed to reduce flicker caused by illumination from an image signal which is generated by an image sensor and which has the flicker. The method includes the steps of: calculating, on a frame-by-frame basis, a value of a line integral of luminance values with respect to each of a plurality of horizontal lines that are included in a frame based on an image signal associated with each of the plurality of horizontal lines; calculating a line average value by working out the average of the values of the line integral on the same horizontal line between the newest frame and a number of other frames gotten earlier than the newest one; generating waveform data comprised of normalized values by performing normalization processing by dividing each said value of a line integral by the line average value of the same horizontal line and subtracting one from the quotient; and extracting information about the phase and frequency of the flicker by detecting, in the multiple frames, a horizontal line location where the waveform data gotten from the waveform data generating section has a value of substantially zero.

Embodiment 1

A first embodiment of the present invention will now be described.

Configuration of Image Capture Device 100

FIG. 1 is a block diagram illustrating a configuration for an image capture device 100 according to this embodiment. The image capture device 100 shoots a subject image, processes the image shot, and then writes it on a storage medium. The image capture device 100 may be a digital camcorder or a digital still camera, for example.

This image capture device 100 includes an optical system 101, an image sensor 102, a controller 103, an AFE (analog front end) section 104, an optical system driver 105, an image sensor (IS) control section 106, a digital signal processing section 107, and a memory 110.

These components will now be described in detail one by one with reference to FIG. 1.

The optical system 101 has a diaphragm, an optical image stabilizer lens and multiple groups of lenses including a zoom lens and a focus lens. By moving the zoom lens along the optical axis, the subject image can be either zoomed in on or zoomed out. Also, by moving the focus lens along the optical axis, the focus of the subject image can be adjusted. The number of lenses that form this optical system 101 may be appropriately determined according to the function required.

The image sensor 102 may be a CMOS (complementary metal oxide semiconductor) sensor, for example. The image sensor 102 converts the light being imaged on an image capturing plane by the optical system 101 into an electrical signal to generate an analog image signal, and then outputs the analog image signal thus generated to the AFE section 104. The image sensor 102 performs line exposure, transfer and various other kinds of operations. The line exposure is also called a "rolling shutter".

The controller 103 may be implemented as a semiconductor element, for example. The controller 103 may be implemented as only a set of hardware components or as a combination of hardware components and software. The controller 103 may be implemented as a microcomputer, for example. And the controller 103 controls the image capture device 100 in its entirety.

Under the control of the controller 104, the AFE section 104 subjects an analog image signal supplied from the image sensor 102 to analog signal processing such as noise reduction by CDS (correlated double sampling), and then converts the analog image signal thus processed into a digital image signal.

In accordance with the instruction given by the controller 103, the optical system driver 105 drives the diaphragm, zoom lens and focal lens which are included in the optical system 101.

In accordance with the instruction given by the controller 103, the image sensor (IS) control section 106 controls the image sensor 102.

The digital signal processing section 107 may be implemented as a digital signal processor (DSP), for example, and includes a flicker reducing section 200, a signal processing section 108 and a compression coding section 109.

The digital signal processing section 107 subjects the digital image signal supplied from the AFE section 104 to digital signal processing, thereby generating an output image file for the image capture device 100.

The flicker reducing section 200 relieves the digital image signal supplied from the AFE section 104 of a flicker component which has been produced due to illumination's flickering as bright and dark portions in an image that has been shot under an environment illuminated with a fluorescent lamp. A detailed configuration for this flicker reducing section 200 will be described later.

The signal processing section 108 subjects the digital image signal supplied from the flicker reducing section 200 to various kinds of processing such as gamma correction, white balance correction, flaw correction and image format conversion according to the form of the output image.

The compression coding section 109 compresses the digital image signal supplied from the signal processing section 108 in a compression format compliant with the H. 264 standard or the MPEG-2 standard, for example.

The memory 110 may be implemented as a flash memory or a ferroelectric memory, for example, and can store data such as an image file generated by the digital signal processing section 107.

Configuration for Flicker Reducing Section 200

A block configuration for the flicker reducing section 200 will be described with reference to FIG. 2.

Figure 2:
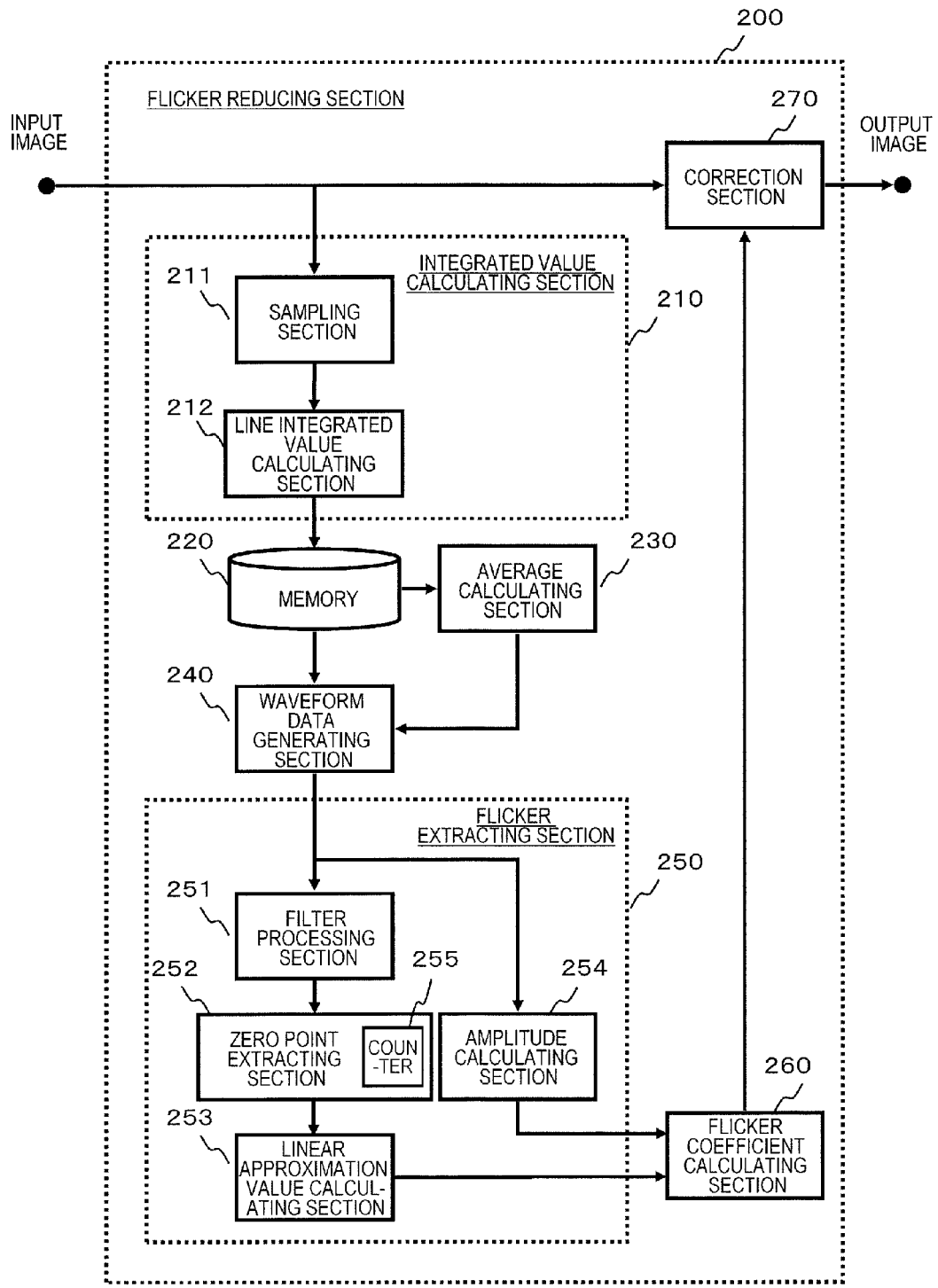
FIG. 2 is a block diagram illustrating a configuration for the flicker reducing section 200 according to the first exemplary embodiment.

FIG. 2 is a block diagram illustrating a configuration for the flicker reducing section 200 according to this embodiment.

The flicker reducing section 200 includes an integrated value calculating section 210, an internal memory 220, an average calculating section 230, a waveform data generating section 240, a flicker extracting section 250, a flicker coefficient calculating section 260 and a correction section 270.

The integrated value calculating section 210 includes a sampling section 211 and a line integrated value calculating section 212. The flicker extracting section 250 includes a filter processing section 251, a zero point extracting section 252, a linear approximation value calculating section 253 and an amplitude calculating section 254.

These elements may be implemented as hardware components. For example, if the flicker reducing section 200 is an application specific integrated circuit (ASIC) chip which was specially designed and produced for the image capture device 100, the respective elements may be implemented as independent integrated circuits within the flicker reducing section 200.

Alternatively, the flicker reducing section 200 may also be implemented as a general-purpose processor which can perform the functions of the respective elements. For example, a computer program which is defined to get the functions of the respective elements performed may be installed in a memory built in the processor, and the functions of those elements may be performed by making the processor execute that computer program sequentially.

Still alternatively, the flicker reducing section 200 may also be implemented as a combination of hardware components and a software program as well.

Operation of Image Capture Device 100

First, the operation of the image capture device 100 will be outlined. After that, it will be described how the flicker reducing section 200 built in the image capture device 100 operates.

The image sensor 102 converts the light that has been imaged onto the image capturing plane by the optical system 101 into an electrical signal, thereby generating an analog image signal.

Next, the AFE section 104 performs analog signal processing on the analog image signal supplied from the image sensor 102 to convert the processed analog image signal into a digital image signal.

Subsequently, the flicker reducing section 200 of the digital signal processing section 107 relieves the digital image signal supplied from the AFE section 104 of a flicker component produced in the signal.

Thereafter, the signal processing section 108 of the digital signal processing section 107 subjects the digital image signal supplied from the flicker reducing section 200 to various kinds of processing including gamma correction, white balance correction, flaw correction, and image format conversion compliant with the output image form.

Next, the compression coding section 109 of the digital signal processing section 107 compresses the digital image signal supplied from the signal processing section 108 in a compression format compliant with the H. 264 standard or the MPEG-2 standard, for example, thereby turning it into a compressed image file. Finally, the controller 103 writes the compressed image file on the memory 110.

Next, it will be described with reference to FIGS. 3 through 9 how the flicker reducing section 200 operates.

Figure 3:
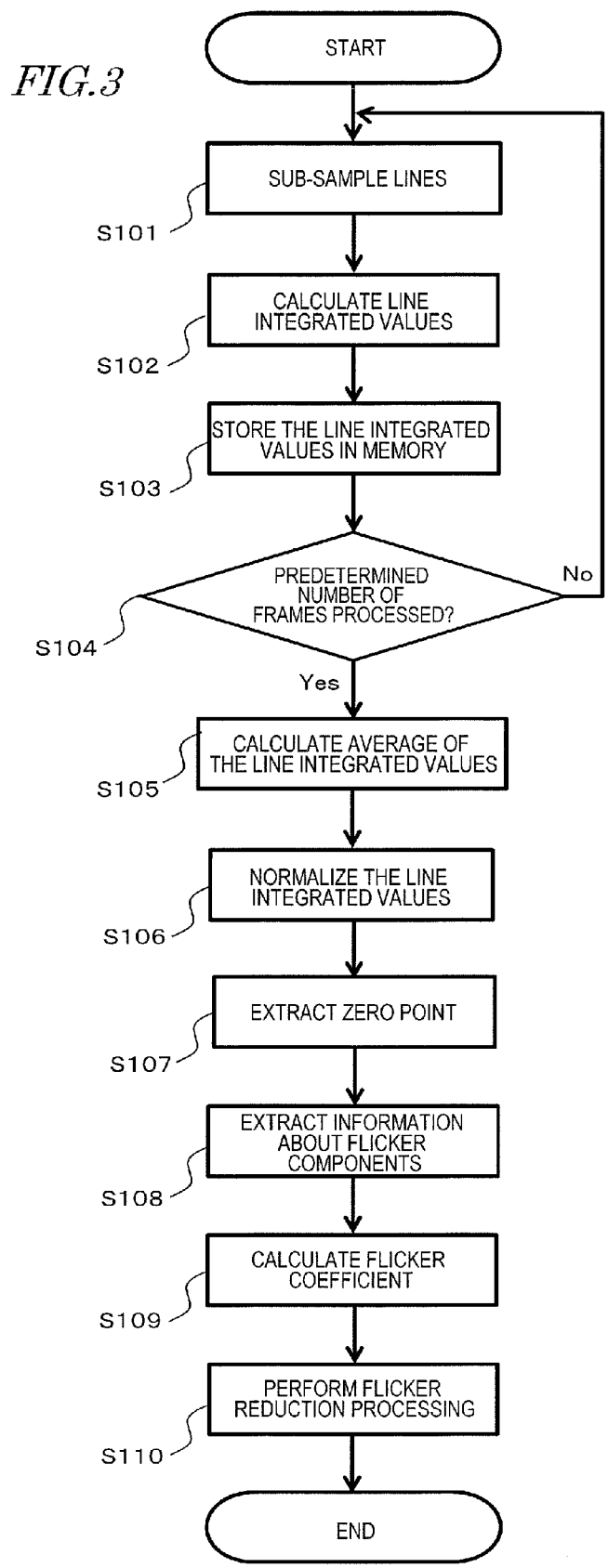
FIG. 3 is a flowchart showing the procedure of operation of the flicker reducing section 200.

FIG. 3 is a flowchart showing the procedure of operation of the flicker reducing section 200.

The sampling section 211 extracts some of a plurality of horizontal lines that form a single frame of the input image. Such a line extraction operation by the sampling section 211 will be sometimes hereinafter referred to as "sub-sampling".

The sampling section 211 outputs a digital image signal representing those horizontal lines extracted to the line integrated value calculating section 212 (in Step S101). For example, the sampling section 211 may output digital image signals representing multiple sets of horizontal lines to the line integrated value calculating section 212 one set after another on an eight line basis.

Next, the line integrated value calculating section 212 calculates the value of the line integral of pixel values (i.e., their luminance values) on each of the horizontal lines extracted based on the digital image signal representing that horizontal line (in Step S102). Then, the line integrated value calculating section 212 writes the value of the line integral calculated into the memory 220. The value of the line integral is obtained by finding the integral of the luminance values of respective pixels on each horizontal line.

Figure 4:
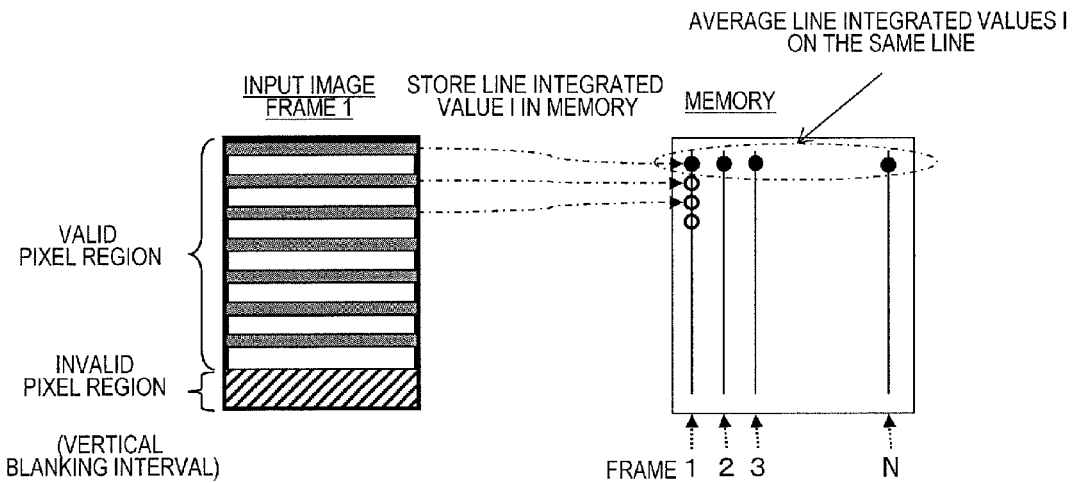
FIG. 4 illustrates conceptually how to perform line integration processing on a single image frame.

FIG. 4 illustrates conceptually how to perform line integration processing on a single image frame. As shown in FIG. 4, a single image frame has a valid pixel region and an invalid pixel region, which is generally called a "vertical blanking interval". The line integrated value calculating section 212 sequentially calculates the values of the line integral of luminance values with respect to one of those horizontal lines extracted per frame after another. In this case, the line integrated value calculating section 212 does not calculate the value of the line integral of pixel values on any horizontal line falling within the vertical blanking interval.

Next, the line integrated value calculating section 212 writes the value of the line integral of pixel values thus calculated for each of those horizontal lines into the memory 220 (in Step S103). After having written the values of the line integral of pixel values on every horizontal line of the first frame (e.g., Frame #1 shown in FIG. 4) into the memory 220, the line integrated value calculating section 212 writes the values of the line integral of pixel values on horizontal lines of the next frame into the memory 220.

Figure 5:
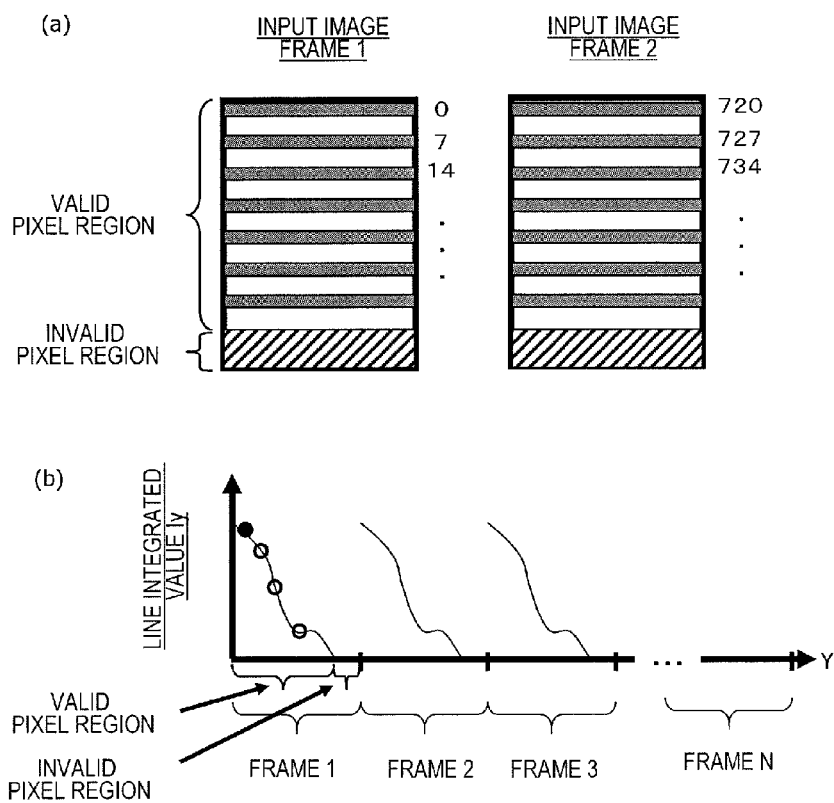
FIG. 5 is a graph showing the values of the line integral of N frames that have been written into the memory 220.

FIG. 5 is a graph showing the values of the line integral of N frames that have been written into the memory 220. In FIG. 5, the ordinate represents the value of the line integral Iy and the abscissa represents the numbers of the series of horizontal lines which are present in Frames #1 through #N.

The numbers of the series of horizontal lines which are present in Frames #1 through #N will be described with reference to FIG. 5(a). FIG. 5(a) illustrates the first and second input image frames (Frames #1 and #2) in each of which the number of horizontal lines in the effective pixel area is 720. Suppose the horizontal line at the top of the first input image frame #1 is the zeroth horizontal line. Since the sampling section 211 extracts every eighth horizontal line, the next horizontal line to be stored in the memory 220 becomes the seventh horizontal line. After that, the numbers will be assigned to every eighth line.

Next, #720 is assigned to the horizontal line located at the top of the second input image frame #2. The horizontal line numbers will be assigned in the same way to the third input image frame #3 and on. Thus, 720*(N−1) will be assigned to the horizontal line located at the top of the $N^{th}$ input image frame #N.

Since some horizontal lines have been sub-sampled by the sampling section 211, the respective values of the line integral are plotted at discrete horizontal line number positions as shown in FIG. 5(b).

The line integrated value calculating section 212 writes the values of the line integral of pixel values on the horizontal lines of a predetermined number N of frames into the memory 220 (in Step S104). The predetermined number N of frames may be 10, for example. The line integrated value calculating section 212 performs the same series of processing steps S101 to S103 over and over again until the predetermined number N of frames is reached.

As can be seen, there is no need to get the value of the line integral of pixel values for every one of the horizontal lines that form a frame, but the memory 220 just needs to have space to store the value of the line integral of pixel values with respect to only those horizontal lines that have been extracted by the sampling section 211. As a result, the memory size can be reduced.

Next, the average calculating section 230 calculates a line average value by working out the average of the values of the line integral on the same horizontal line between the newest frame (i.e., Frame #N) and a number of other frames (i.e., Frames #1 through #N−1) gotten earlier than the newest one in the memory 220 (in Step S105).

As shown in FIG. 4, the average calculating section 230 calculates the integral of the values of the line integral on the same horizontal line from Frame #1 through Frame #N, and divides the integral of the values of the line integral by the number N of frames, thereby calculating a line average value. The average calculating section 230 calculates the line average value for every horizontal line on the memory 220 and transmits the line average value calculated to the waveform data generating section 240.

Next, the waveform data generating section 240 performs normalization processing by dividing each of the values of the line integral stored in the memory 220 by the line average value on the same horizontal line and subtracting one from the quotient, thereby generating waveform data comprised of normalized values (in Step S106).

The waveform data generating section 240 normalizes the values of the line integral in the memory 220 by the following Equation (1):

$$V(i, j) = \frac{Iy(i, j)}{Imy(i)} - 1 \tag{1}$$

where Imy(i) represents the line average value of the i$^{th}$ line in a single frame, Iy(i, j) represents the value of the line integral of the i$^{th}$ horizontal line in Frame #J, and V(i, j) is a normalized value of Iy(i, j). J is a value falling within the range of 1 to N and corresponding to the number of frames stored in the memory 220. i is a value corresponding to the number of horizontal lines in a single frame, and may be a value falling within the range of 0 to 719 if the number of lines in the valid pixel region is 720. However, since some horizontal lines have been sub-sampled by the sampling section 211, i becomes a discrete value between 0 and 719.

Figure 6:
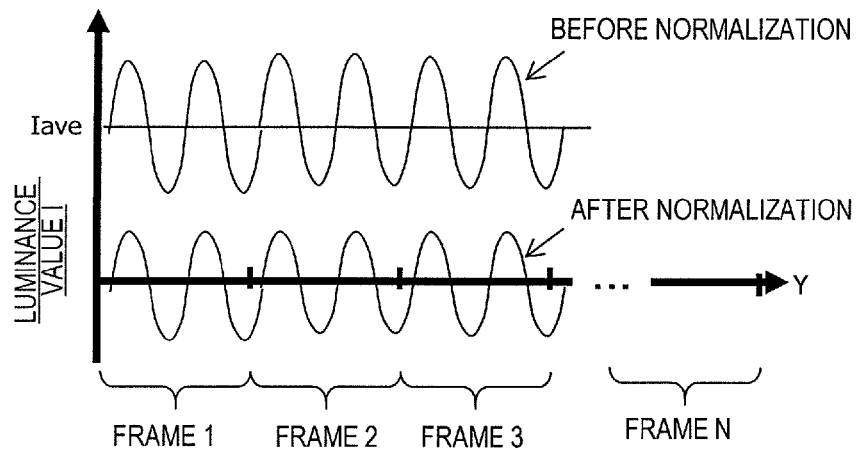
FIG. 6 illustrates how to generate waveform data.
Figure 6:
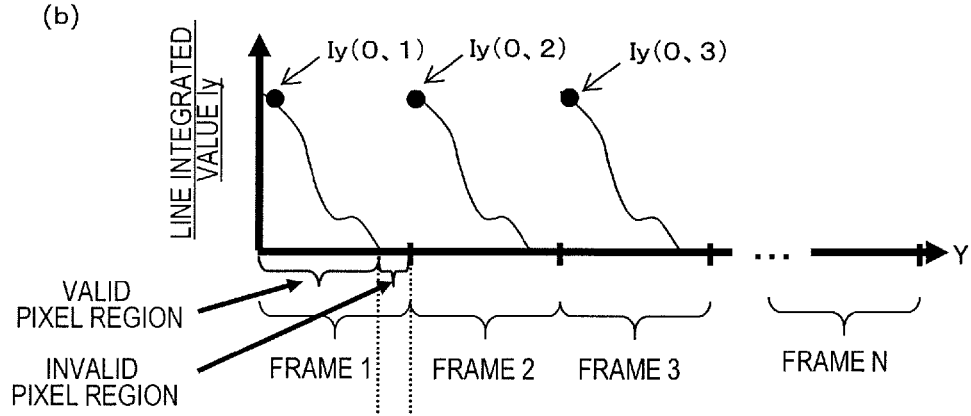
Figure 6:
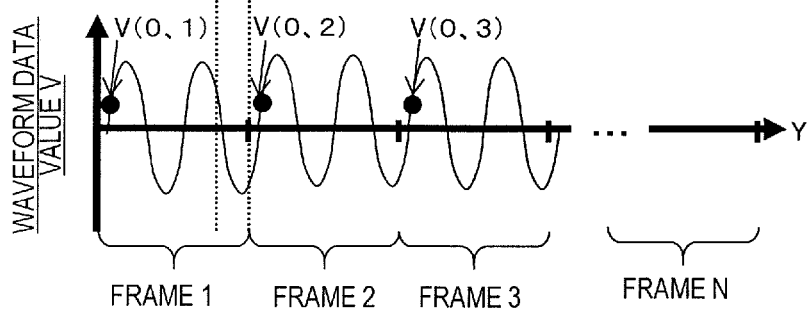

FIG. 6 illustrates how to generate waveform data. First of all, it will be described with reference to FIG. 6(a) how to normalize the value of the line integral by Equation (1). As shown in FIG. 6(a), typically the flicker luminance signal can be regarded as being superposed on the average luminance Iave of the entire frame. That is why by dividing the luminance value I of each pixel value on which the flicker luminance signal is superposed by the average luminance Iave and by subtracting one from the quotient, a waveform having the same frequency and same initial phase as the flicker waveform can be reproduced.

In FIG. 6(b), the ordinate represents the value of the line integral Iy(i, j) and the abscissa represents the numbers of a series of horizontal lines which are present in Frame #1 through Frame #N. FIG. 6(b) shows three points with values of the line integral Iy(0, 1), Iy(0, 2), and Iy(0, 3), which respectively represent the values of the line integral of pixel values on the zeroth horizontal line in Frames #1, #2 and #3 that are stored in the memory 220.

The waveform data generating section 240 normalizes, by Equation (1), the respective values of the line integral Iy(i, j) associated with the horizontal lines in Frames #1 through #N that are stored in the memory 220. In FIG. 6(c), the ordinate represents the normalized value of the line integral V(i, j) and the abscissa represents the numbers of a series of horizontal lines which are present in Frames #1 through #N. FIG. 6(c) shows V(0, 1), V(0, 2) and V(0, 3) which are obtained by normalizing the values of the line integral Iy(0, 1), Iy(0, 2), and Iy(0, 3), respectively, by Equation (1).

By plotting every normalized value V(i, j) as a point and by connecting those points with a curve together, a periodic waveform such as the one shown in FIG. 6(c) can be obtained. The waveform shown in FIG. 6(c) represents the waveform of flicker produced by illumination's flickering. Since the sampling section 211 extracts every eighth horizontal line as described above, the waveform data generating section 240 reproduces a waveform having the same frequency and same initial phase as the flicker waveform at a sampling interval of 8 lines in the range of Frame #1 to Frame #N.

The waveform data generating section 240 outputs the waveform data thus obtained to the flicker extracting section 250 on the next stage.

Next, the flicker extracting section 250 detects a horizontal line location (i.e., finds its number) where the waveform data gotten from the waveform data generating section 240 becomes substantially equal to zero in multiple frames, thus extracting information about the phase and frequency of the flicker (in Steps S107 and S108).

When the waveform data generating section 240 is reproducing a waveform having the same frequency and same initial phase as the flicker waveform, the subject's movement may have some influence. The reason is that not only the flicker but also the subject's movement are sampled by the image sensor 102 as a variation in brightness and darkness represented by the luminance value.

The filter processing section 251 in the flicker extracting section 250 performs low-pass filter processing on the waveform data gotten from the waveform data generating section 240. The low-pass filter may be designed to be able to filter out such a variation (frequency) in brightness and darkness represented by a luminance value to be caused by the subject's movement. As a result, in reproducing a waveform having the same frequency and same initial phase as the flicker waveform, the influence of the subject's movement can be reduced.

The zero point extracting section 252 detects a horizontal line location where the waveform data value V becomes substantially equal to zero in Frames #1 through #N based on the waveform data that has been subjected to the low-pass filter processing (in Step S107).

Figure 7:
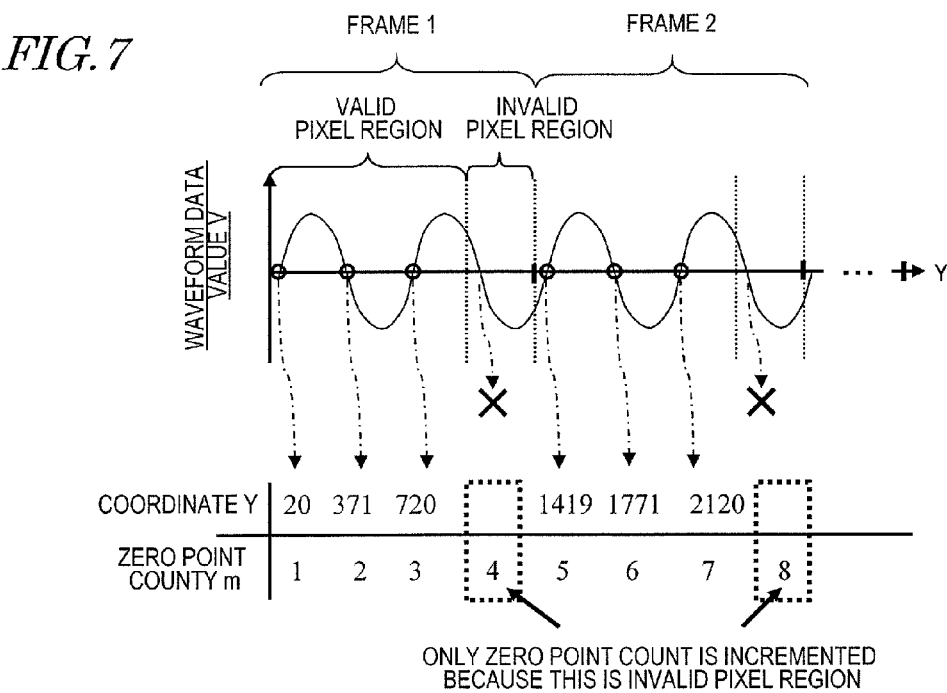
FIG. 7 illustrates how to perform the processing of extracting a zero point based on waveform data.

FIG. 7 illustrates how to perform the processing of extracting a zero point based on waveform data. In FIG. 7, the abscissa represents the coordinates Y of a series of horizontal lines which are present in Frames #1 through #N. The coordinate Y of each horizontal line corresponds to the number of that horizontal line as described above. As shown in FIG. 7, the zero point extracting section 252 counts the number of times the waveform data value V goes substantially zero in the low-pass filtered waveform and calculates a coordinate Y at which the waveform data value V becomes equal to zero.

Since the sampling section 211 has extracted horizontal lines, the waveform data output by the waveform data generating section 240 does not always include data about the coordinate Y at which the waveform data value V becomes substantially equal to zero in the low-pass filtered waveform. That is why the zero point extracting section 252 detects a horizontal line location (i.e., a dividing point) where the waveform data value becomes substantially equal to zero in multiple frames according to a change in the sign of the normalized value, i.e., based on the normalized value before the sign changes and the normalized value after the sign has changed.

Figure 8:
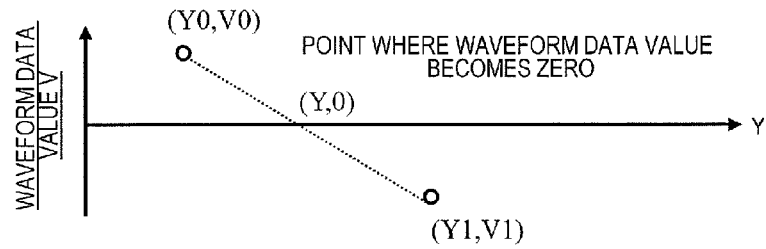
FIG. 8 illustrates how to calculate a dividing point by linear approximation.

FIG. 8 illustrates how to calculate, by linear approximation, the coordinate Y of a horizontal line on which the waveform data value V becomes substantially equal to zero. The zero point extracting section 252 monitors a change in the sign of the waveform data value V. On sensing that the sign has changed, the zero point extracting section 252 uses two adjacent waveform data values (Y0, V0) and (Y1, V1) before and after the sign changes to calculate, by linear approximation, the coordinate Y of the dividing point where the waveform data value V becomes substantially equal to zero by the following Equation (2):

$$Y = \frac{V1*Y0 - V0*Y1}{V1 - V0} \quad (2)$$

where V0 and V1 represent the two adjacent waveform data values V and Y0 and Y1 represent the coordinates Y.

Now take a look at FIG. 7 again. In the exemplary waveform shown in FIG. 7, the zero point extracting section 252 locates, as coordinates Y where the waveform data values V become substantially equal to zero, 20, 371, 720, 1419, 1771 and 2120.

As described above, the line integrated value calculating section 212 does not calculate the value of the line integral of pixel values on any horizontal line during the vertical blanking interval. That is why there are no coordinates Y or waveform data values V in the invalid pixel region. Also, if the vertical blanking interval is long, then the invalid pixel region becomes broader. As a result, no coordinates at which the waveform data value V actually becomes substantially equal to zero may be obtained by linear approximation using Equation (2). For that reason, the zero point extracting section 252 does not locate any coordinates Y at which the waveform data value V becomes substantially equal to zero in the invalid pixel region.

According to this embodiment, the zero point extracting section 252 includes an internal counter 255, which counts the number of times the waveform data value V becomes equal to zero. Also, the zero point extracting section 252 notifies the counter 255 that the waveform data value V becomes substantially equal to zero in the invalid pixel region, too. The reason why the invalid pixel region is included will be described later.

In the example shown in FIG. 7, in the low-pass filtered waveform, the number of times the waveform data value V goes zero is eight. The counter 255 increments its count in the invalid pixel region, too, in response to the notification received from the zero point extracting section 252. The initial value of the counter is zero. On locating the coordinate Y20, the zero point extracting section 252 notifies the counter 255 that the waveform data value V becomes substantially equal to zero. In response to this notification, the counter 255 increments its count to "1". After that, the count will go up to "2", "3" and so on. On being notified that the waveform data value V becomes substantially equal to zero in the invalid pixel region, the counter 255 increments its count to "4".

The zero point extracting section 252 outputs information in which the coordinate Y at which the waveform data value V becomes substantially equal to zero is associated with counts except the counts about the invalid pixel region (i.e., except the counts "4" and "8" shown in FIG. 7) to the linear approximation value calculating section 253 on the next stage.

Next, the linear approximation value calculating section 253 extracts information about the phase and frequency of the flicker by linear regression by reference to the information provided by the zero point extracting section 252 (in Step S108).

Figure 9:
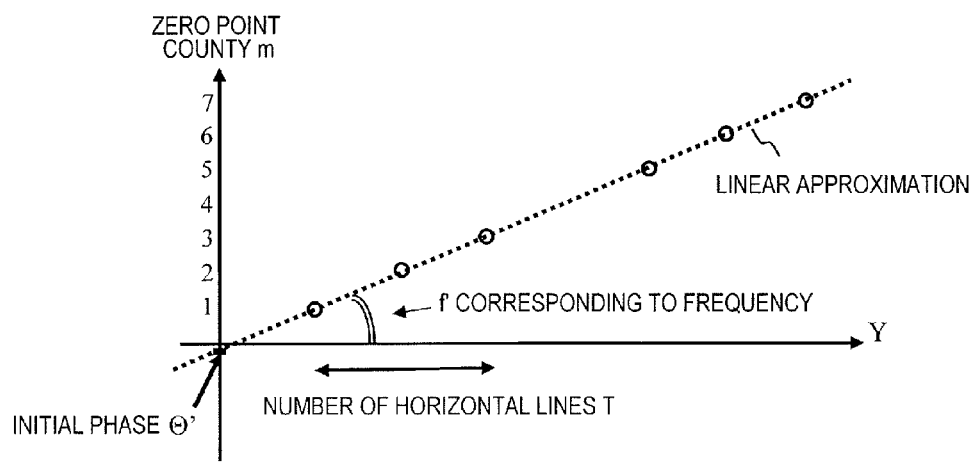
FIG. 9 illustrates how to extract information about the phase and frequency of the flicker by linear regression.

FIG. 9 illustrates how to extract information about the phase and frequency of the flicker by linear regression. In FIG. 9, the abscissa represents the coordinate Y and the ordinate (on m-axis) represents the count of the counter 255. Based on at least three sets of coordinates Y and counts which are included in the information provided by the zero point extracting section 252, the linear approximation value calculating section 253 calculates the gradient of the line and the value of an intercept on the m-axis by linear regression.

As shown in FIG. 9, the number of horizontal lines included in one period of the waveform corresponds to that waveform's period T. The gradient of the line becomes the inverse number of the waveform's period T. That is why the gradient of the line represents the frequency f of the flicker. Also, the value of an intercept on the m-axis represents the initial phase of the frame. As can be seen, by calculating the gradient of the line and the value of an intercept on the m-axis, the linear approximation value calculating section 253 can extract information about the phase and frequency of the flicker.

A variation in brightness and darkness represented by a luminance value due to the movement of the subject and/or the shake of the camera body sometimes affects the waveform of flicker. In a flicker waveform oscillating at a particular frequency, a point where the amplitude becomes equal to zero recurs periodically. And if such points where the amplitude becomes equal to zero and the number of times are plotted as coordinates, then those coordinates will be arranged in line by nature.

Next, it will be described why the counter 255 performs the operation of incrementing its count in the invalid pixel region, too. If the counter 255 performed the operation of incrementing its count with the invalid pixel region excluded, then the count at the point where the coordinate Y is 1419 as shown in FIG. 7 would be "4". In that case, the periodicity would be lost and even if the points where the coordinate Y is 1419 and the count is "4" were plotted, those points would not be arranged in line. Likewise, following points (i.e., points where the coordinate Y are 1770 and 2120) would also be off the line. It is to avoid such deviation (i.e., the loss of the periodicity) that the counter 255 performs the operation of incrementing its count in the invalid pixel region, too.

Even in the waveform reproduced by the waveform data generating section 240, such a point where the amplitude goes zero recurs periodically. There are coordinates Y where the waveform data value V become substantially equal to zero, and if the sets of coordinates Y and counts are plotted as coordinates, those coordinates will be arranged in line. By obtaining those coordinate points defined by the coordinates Y and counts by linear approximation, even if the respective points of the waveform data were disturbed by the subject's movement or the camera shake, flicker information could also be extracted as the waveform data as a whole. As a result, even if some horizontal lines are sub-sampled from an input image frame, the flicker detection accuracy can still be increased.

In addition, according to this embodiment, the filter processing section 251 in the flicker extracting section 250 performs low-pass filter processing on the waveform data gotten from the waveform data generating section 240. As a result, the number of zero points in the vicinity of the coordinate Y where the waveform data value V becomes substantially equal to zero can be reduced, and the flicker detection accuracy can be further increased.

The amplitude calculating section 254 calculates the standard deviation a of the waveform data value V. The amplitude calculating section 254 calculates the amplitude A of the flicker by the following Equation (3) (in Step S108):

$$A = \sqrt{2}\sigma \quad (3)$$

where σ represents the standard deviation of the waveform data value V.

Next, the flicker coefficient calculating section 260 calculates a flicker coefficient associated with the current input image I to be supplied to the flicker reducing section 210 by reference to the flicker information (about its frequency, phase and amplitude) provided by the flicker extracting section 250 (in Step S109).

Next, the correction section 270 performs flicker reduction processing on the current input image I using the flicker coefficient provided by the flicker coefficient calculating section 260 (in Step S110). More specifically, the correction section 270 performs the processing of relieving the input image I of flicker by dividing the input image I by the flicker coefficient plus one. Then, the correction section 270 outputs the image data thus processed to the signal processing section 108 on the next stage.

An exemplary timing for the flicker reducing section 210 to update the flicker coefficient will be described.

The flicker coefficient is updated at a predetermined timing, which may be every 12 frames, for example. The flicker reducing section 210 calculates a flicker coefficient A based on the first twelve frames #1 through #12 which form part of a series of frames that make up a moving picture stream. In the range of Frame #13 to Frame #24, the correction section 270 performs the processing of relieving the input image I of flicker using the flicker coefficient A. And in the next range of Frame #25 to Frame #36, the correction section 270 performs the processing of relieving the input image I of flicker using the flicker coefficient B based on Frames #13 through #24.

According to an aspect of the present invention, in order to reduce the influence of the subject's movement or camera shake on flicker reduction processing, an increased number of frames are used for analysis, thereby increasing the flicker detection accuracy and cutting down the memory space to use.

Other Modified Examples

In the first embodiment described above, the device including the flicker reducing section 200 is supposed to be an image capture device. However, this is just an example of an aspect of the present invention. Alternatively, the device including the flicker reducing section 200 may also be a recorder.

In the first embodiment described above, the line integrated value calculating section 212 is supposed to calculate the value of the line integral of pixel values on a horizontal line. However, this is only an example of an aspect of the present invention. Alternatively, the line integrated value calculating section 212 may also calculate the value of the line integral of pixel values on each horizontal line and divide the value of the line integral by the number of pixels on the horizontal line, thereby calculating the average of the value of the line integral.

In the first embodiment described above, the value of the line integral is an integral value of the luminance values of respective pixels which are present on each horizontal line. However, this is only an example of an aspect of the present invention. Alternatively, the line integrated value calculating section 212 may also obtain the value of the line integral by calculating the integral value of only the luminance values of pixels that satisfy a predetermined condition on a horizontal line or may normalize the value of the line integral by dividing the value of the line integral by the number of pixels that satisfy a predetermined condition. If each luminance value is expressed in 12 bits, the "predetermined condition" may be that the luminance value of a pixel should fall within the range of a lower limit value of 204 to an upper limit value of 3481. By setting the luminance value of each pixel to be equal to or greater than the lower limit value, pixels, of which the SNRs (signal-to noise ratios) are not good, can be removed. And by setting the luminance value of each pixel to be equal to or smaller than the upper limit value, pixels that could be saturated can be removed. Thus, it is expected that information about the frequency, phase and amplitude of the flicker would be detected more accurately.

Also, in the first embodiment described above, if the flicker's amplitude extracted by the flicker extracting section 210 is equal to or smaller than a predetermined value, the correction section 270 does not have to perform the flicker reduction processing. As a result, the power dissipated by the correction section 270 can be cut down.

Also, in the first embodiment, the image sensor 120 is supposed to be a CMOS sensor. However, this is just an example of an aspect of the present invention. Alternatively, the image sensor 120 may also be a CCD (charge-coupled device) sensor, which is a global shuttering image sensor and which can reduce flicker to be produced between frames due to global shuttering.

Furthermore, in the first embodiment described above, an input image supplied to the flicker reducing section 210 is a digital image signal that has been output from the AFE section 104. This digital image signal is RAW data and may have a width of 12 bits, for example. However, this is just an example of an aspect of the present invention. Alternatively, the input image supplied to the flicker reducing section 210 may also be compressed image data which has been compressed compliant with the H. 264 standard, for example. The compressed image data may be a signal with a width of 8 bits, for example. As the bit width of the compressed image data is narrower than that of RAW data, the flicker detection accuracy somewhat decreases but the compressed image data can be relieved of the flicker anyway.

If the flicker reducing section 210 processes compressed image data, as aspect of the present invention is also applicable to a computer program to be installed into a memory on a cloud server.

The user of the cloud server uploads compressed image data (moving picture data) to the cloud server. In response, the computer of the cloud server executes a computer program installed in its memory, thereby removing flicker components from the moving picture data with the flicker components. By downloading the moving picture data thus processed, the user can get moving picture data from which the flicker components have been removed.

An aspect of the present invention is also applicable to software (computer program) which defines the flicker reduction processing of the first embodiment described above. The operation defined by such a computer program may be as shown in FIG. 3, for example. Such a computer program may be not only circulated by being recorded on a removable storage medium but also downloaded through telecommunications lines as well. If a processor built in a computer executes such a computer program, the various operations that have already been described for the first embodiment can be carried out.

INDUSTRIAL APPLICABILITY

An image capture device according to an aspect of the present invention can be used effectively to relieve an image signal representing an image shot of flicker which has been produced as bright and dark portions in the image shot due to illumination's flickering.

REFERENCE SIGNS LIST 100 image capture device
101 optical system
102 image sensor
103 controller
104 AFE section
105 optical system driver
106 IS control section
107 digital signal processing section
108 signal processing section
109 compression coding section
110 memory
200 flicker reducing section
210 integrated value calculating section
211 sampling section
212 line integrated value calculating section
220 memory
230 average calculating section
240 waveform data generating section
250 flicker extracting section 251 filter processing section
252 zero point extracting section
253 linear approximation value calculating section
254 amplitude calculating section
255 counter
260 flicker coefficient calculating section
270 correction section

The invention claimed is:

1. An image capture device which reduces flicker caused by illumination from an image signal which has the flicker, the device comprising:
 an image sensor which captures a subject image and generates the image signal;
 an integrated value calculating section which calculates, on a frame-by-frame basis, a value of a line integral of luminance values with respect to each of a plurality of horizontal lines that are included in a frame based on an image signal associated with each of the plurality of horizontal lines;
 a memory which stores the values of the line integral of multiple images;
 an average calculating section which calculates a line average value by working out the average of the values of the line integral on the same horizontal line between the newest frame in the memory and a number of other frames gotten earlier than the newest one in the memory;
 a waveform data generating section which generates waveform data comprised of normalized values by performing normalization processing by dividing each of the values of the line integral stored in the memory by the line average value of the same horizontal line and subtracting one from the quotient; and
 a flicker extracting section which extracts information about the phase and frequency of the flicker by detecting, in the multiple frames, a horizontal line location where the waveform data gotten from the waveform data generating section has a value of substantially zero.

2. The image capture device of claim 1, wherein the flicker extracting section includes a counter which increments its count every time the location is detected, and
 the flicker extracting section detects the location at least three times and extracts information about the phase and frequency of the flicker by linear regression by reference to the counter's value and information about the location.

3. The image capture device of claim 2, wherein the frame includes an image in a valid pixel region and an image in an invalid pixel region in a vertical blanking interval with respect to the image sensor, and
 the counter increments its count every time the location is detected in the valid pixel region and in the invalid pixel region.

4. The image capture device of claim 1, wherein at least one of the number of frames stored in the memory and the number of frames retrieved by the average calculating section from the memory is determined by the frame rate of the image sensor.

5. The image capture device of claim 1, wherein the flicker extracting section calculates the amplitude of the flicker by multiplying the standard deviation of the normalized value by $\sqrt{2}$.

6. The image capture device of claim 1, wherein the flicker extracting section performs low-pass filter processing on the waveform data.

7. The image capture device of claim 1, wherein the flicker extracting section detects the location of a horizontal line, where the value of the waveform data becomes substantially equal to zero, in the multiple frames according to a change in the sign of the normalized value, based on respective normalized values before and after the sign changes.

8. An integrated circuit which reduces flicker caused by illumination from an image signal which is generated by an image sensor and which has the flicker, the circuit being configured to:
 calculate, on a frame-by-frame basis, a value of a line integral of luminance values with respect to each of a plurality of horizontal lines that are included in a frame based on an image signal associated with each of the plurality of horizontal lines;
 calculate a line average value by working out the average of the values of the line integral on the same horizontal line between the newest frame and a number of other frames gotten earlier than the newest one;
 generate waveform data comprised of normalized values by performing normalization processing by dividing each said value of the line integral by the line average value of the same horizontal line and subtracting one from the quotient; and
 extract information about the phase and frequency of the flicker by detecting, in the multiple frames, a horizontal line location where the waveform data gotten from the waveform data generating section has a value of substantially zero.

9. The integrated circuit of claim 8, further comprising a memory,
 wherein the memory stores the values of the line integral of multiple frames.

10. A flicker reducing method for reducing flicker caused by illumination from an image signal which is generated by an image sensor and which has the flicker, the method comprising the steps of:
 calculating, on a frame-by-frame basis, a value of a line integral of luminance values with respect to each of a plurality of horizontal lines that are included in a frame based on an image signal associated with each of the plurality of horizontal lines;
 calculating a line average value by working out the average of the values of the line integral on the same horizontal line between the newest frame and a number of other frames gotten earlier than the newest one;
 generating waveform data comprised of normalized values by performing normalization processing by dividing each said value of the line integral by the line average value of the same horizontal line and subtracting one from the quotient; and
 extracting information about the phase and frequency of the flicker by detecting, in the multiple frames, a horizontal line location where the waveform data gotten from the waveform data generating section has a value of substantially zero.

* * * * *